(12) United States Patent
Zhang et al.

(10) Patent No.: US 10,134,037 B2
(45) Date of Patent: Nov. 20, 2018

(54) MULTIMEDIA DATA CAPTURE AND PROCESSING DEVICE HAVING IMAGE SENSOR INTEGRATED AND EMBEDDED DURING MANUFACTURE WITH PRESET INFORMATION FOR BROADCASTING TO PEOPLE

(71) Applicants: Guangbin Zhang, Cupertino, CA (US); Jiangtao Pang, Fremont, CA (US)

(72) Inventors: Guangbin Zhang, Cupertino, CA (US); Jiangtao Pang, Fremont, CA (US)

(73) Assignee: CISTA SYSTEM CORP., Grand Cayman (KY)

( * ) Notice: Subject to any disclaimer, the term of this patent is extended or adjusted under 35 U.S.C. 154(b) by 131 days.

(21) Appl. No.: 14/843,995

(22) Filed: Sep. 3, 2015

(65) Prior Publication Data

US 2016/0140552 A1  May 19, 2016

Related U.S. Application Data

(60) Provisional application No. 62/045,008, filed on Sep. 3, 2014.

(51) Int. Cl.
*G06F 17/30* (2006.01)
*G06Q 20/40* (2012.01)
*G06Q 30/02* (2012.01)
*G06Q 30/06* (2012.01)

(52) U.S. Cl.
CPC ....... *G06Q 20/401* (2013.01); *G06F 17/3005* (2013.01); *G06F 17/30017* (2013.01); *G06F 17/30781* (2013.01); *G06Q 30/0241* (2013.01); *G06Q 30/0601* (2013.01)

(58) Field of Classification Search
CPC .......... G06F 17/30017; G06F 17/3005; G06F 17/30781; G06Q 30/0241
USPC ........................................ 715/201, 202, 203
See application file for complete search history.

(56) References Cited

U.S. PATENT DOCUMENTS

| | | | | |
|---|---|---|---|---|
| 7,663,670 B1* | 2/2010 | Orboubadian | ....... | H04N 1/2112 348/231.2 |
| 2003/0033529 A1* | 2/2003 | Ratnakar | ............... | G06T 1/0028 713/176 |
| 2003/0046240 A1* | 3/2003 | Stone | ...................... | G06F 21/10 705/51 |
| 2003/0123701 A1* | 7/2003 | Dorrell | ................... | G06F 21/64 382/100 |
| 2005/0169499 A1* | 8/2005 | Rodriguez | .............. | G01S 19/14 382/100 |
| 2006/0212705 A1* | 9/2006 | Thommana | .......... | G06T 1/0021 713/176 |

(Continued)

*Primary Examiner* — Cesar B Paula
*Assistant Examiner* — Yahao Chen
(74) *Attorney, Agent, or Firm* — Guosheng Wang; United States Research and Patent Firm

(57) ABSTRACT

The present application relates to a multimedia data capture and processing (C&P) device. In an example, the multimedia data C&P device comprises a multimedia sensor configured to capture a first multimedia data; and a device processor configured to obtain a preset information, and generate a second multimedia data according to the first multimedia data and the preset information, at least a part of the second multimedia data presenting the preset information. The present application also relates to a user terminal and multimedia data processing server.

16 Claims, 13 Drawing Sheets

(56) References Cited

U.S. PATENT DOCUMENTS

| | | | |
|---|---|---|---|
| 2006/0239500 A1* | 10/2006 | Meyer | G06T 1/0028 382/100 |
| 2007/0101359 A1* | 5/2007 | Schiller | H04H 20/103 725/33 |
| 2007/0154060 A1* | 7/2007 | Sun | G06T 1/0021 382/100 |
| 2008/0097915 A1* | 4/2008 | Golan | G06Q 30/0273 705/51 |
| 2008/0184288 A1* | 7/2008 | Lipscomb | G06Q 30/02 725/32 |
| 2009/0022363 A1* | 1/2009 | Stone | G06F 21/10 382/100 |
| 2009/0141931 A1* | 6/2009 | Yadid-Pecht | G06T 1/0035 382/100 |
| 2010/0076834 A1* | 3/2010 | Sugaya | G06Q 30/02 705/14.26 |
| 2010/0228983 A1* | 9/2010 | Killian | G06F 21/10 713/176 |
| 2010/0332320 A1* | 12/2010 | Mordetsky | G06Q 30/0251 705/14.49 |
| 2011/0299725 A1* | 12/2011 | Rodriguez | G01S 19/14 382/100 |
| 2012/0013770 A1* | 1/2012 | Stafford | H04N 5/272 348/239 |
| 2012/0017236 A1* | 1/2012 | Stafford | A63F 13/00 725/32 |
| 2012/0213402 A1* | 8/2012 | Moreno De Ayala | G06T 1/0071 382/100 |
| 2013/0011071 A1* | 1/2013 | Deng | G06K 9/00711 382/195 |
| 2013/0139193 A1* | 5/2013 | Fan | H04N 7/157 725/14 |
| 2013/0173400 A1* | 7/2013 | Koornneef | G06Q 30/0277 705/14.73 |
| 2014/0359656 A1* | 12/2014 | Banica | H04N 21/812 725/32 |
| 2015/0334433 A1* | 11/2015 | Zeigler | H04N 21/2668 725/35 |
| 2016/0035055 A1* | 2/2016 | Perkins | G06F 21/10 705/310 |
| 2016/0042158 A1* | 2/2016 | Arana | G06F 21/105 726/27 |

* cited by examiner

Preset infromation: "Sponsored by: CST"

MULTIMEDIA DATA CAPTURE AND PROCESSING DEVICE HAVING IMAGE SENSOR INTEGRATED AND EMBEDDED DURING MANUFACTURE WITH PRESET INFORMATION FOR BROADCASTING TO PEOPLE

CROSS-REFERENCE TO RELATED U.S. APPLICATIONS

This application claims the benefit of, and priority to, U.S. Provisional Patent Application Ser. No. 62/045,008, entitled "Imaging device with embedded broadcasting capability and its related business model", filed on Sep. 3, 2014, the entire content of which is incorporated herein by reference for all purposes.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

FIELD OF THE INVENTION

The present application generally relates to the technical field of multimedia data processing, and more particularly, to a multimedia data capture and processing (C&P) device, user terminal, and multimedia data processing server.

BACKGROUND OF THE INVENTION

With the continuous development of global information technology, more and more electronic apparatus such as sound recorders, still cameras, and video cameras, as well as other user terminals having the similar capabilities (e.g., mobile phones, tablets, and so on) appear in people's life. The core components of such apparatus are multimedia data capture and processing (C&P) device. Various multimedia data C&P devices may be utilized to record a conversion, to take a picture, to capture a video clip, or the like. Subsequently, audio data, image data, video data, or other types of multimedia data may be generated for future processing.

Traditionally, a multimedia data generated by a multimedia data C&P device is simply a direct presentation of a captured scene. However, under some circumstances, people may not merely want a direct reflection (in other words, an original presentation) of the experienced scene, but expect to incorporate some additional information into the captured multimedia data in order to achieve a higher level of user convenience. For example, a camera manufacturer may be desired to insert a text or a logo image into a photo to show that this photo is captured by the camera produced by its company, so as to promote brand recognition. But, at present, there is no convenient and effective way for the manufacturer to do this.

Thus, there is a demand for developing a new type of multimedia data C&P devices to achieve the above purpose.

SUMMARY OF THE INVENTION

In order to solve the above technical problems, according to one aspect of the present application, there is provided a multimedia data processing method, comprising: obtaining a first multimedia data captured by a multimedia sensor; obtaining a preset information; and generating a second multimedia data according to the first multimedia data and the preset information, at least a part of the second multimedia data presenting the preset information.

Further, according to another aspect of the present application, there is provided a multimedia data capture and processing (C&P) device, comprising: a multimedia sensor configured to capture a first multimedia data; and a device processor configured to obtain a preset information, and generate a second multimedia data according to the first multimedia data and the preset information, at least a part of the second multimedia data presenting the preset information.

Further, according to another aspect of the present application, there is provided a multimedia data processing method, comprising: generating a multimedia data capturing instruction for capturing a first multimedia data; obtaining the first multimedia data captured by a multimedia sensor; obtaining a preset information; generating a second multimedia data according to the first multimedia data and the preset information, at least a part of the second multimedia data presenting the preset information; and outputting the second multimedia to a user.

Further, according to another aspect of the present application, there is provided a user terminal, comprising: a terminal processor configured to generate a multimedia data capturing instruction for capturing a first multimedia data; a multimedia data capture and processing (C&P) device comprising a multimedia sensor configured to capture the first multimedia data, and a device processor configured to obtain a preset information, and generate a second multimedia data according to the first multimedia data and the preset information, at least a part of the second multimedia data presenting the preset information; and an output device configured to output the second multimedia to a user.

Further, according to another aspect of the present application, there is provided a multimedia data processing method, comprising: receiving a second multimedia data from a user terminal, at least a part of the second multimedia data presenting a preset information; removing the preset information from the second multimedia data to generate a first multimedia data; and sending the first multimedia data to the user terminal.

Further, according to another aspect of the present application, there is provided a multimedia data processing server, comprising: a communication device in communication with a user terminal and configured to receive a second multimedia data from the user terminal, at least a part of the second multimedia data presenting a preset information; and a server processor configured to remove the preset information from the second multimedia data to generate a first multimedia data, the communication device being further configured to send the first multimedia data to the user terminal.

The above features and advantages and other features and advantages of the present application are readily apparent from the following detailed description of the best modes for carrying out the application when taken in connection with the accompanying drawings.

BRIEF DESCRIPTION OF THE SEVERAL VIEWS OF THE DRAWINGS

The present application is illustrated by way of example, and not by way of limitation, in the figures of the accompanying drawings and in which like reference numerals refer to similar elements. All the figures are schematic and generally only show parts which are necessary in order to elucidate the application. For simplicity and clarity of illustration, elements shown in the figures and discussed below have not necessarily been drawn to scale. Well-known structures and devices are shown in simplified form such as block diagrams in order to avoid unnecessarily obscuring the present application. Other parts may be omitted or merely suggested.

DETAILED DESCRIPTION OF THE PREFERRED EMBODIMENT

In the following description, for the purposes of explanation, numerous specific details are set forth in order to provide a thorough understanding of the present application. It is apparent, however, to one skilled in the art that the present application may be practiced without these specific details or with an equivalent arrangement.

It is also to be understood that the terminology used herein is for the purpose of describing particular embodiments only, and is not intended to limit the scope of the application. For example, when an element is referred to as being "on", "connected to", or "coupled to" another element, it can be directly on, connected or coupled to the other element or intervening elements may be present. In contrast, when an element is referred to as being "directly on", "directly connected to", or "directly coupled to" another element, there are no intervening elements present.

Unless otherwise defined, all terms (including technical and scientific terms) used herein have the same meaning as commonly understood by one of ordinary skill in the art to which this present application belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a multimedia data processing method according to an embodiment of the present application will be described with reference to the flowchart in FIG. 1.

Figure 1:
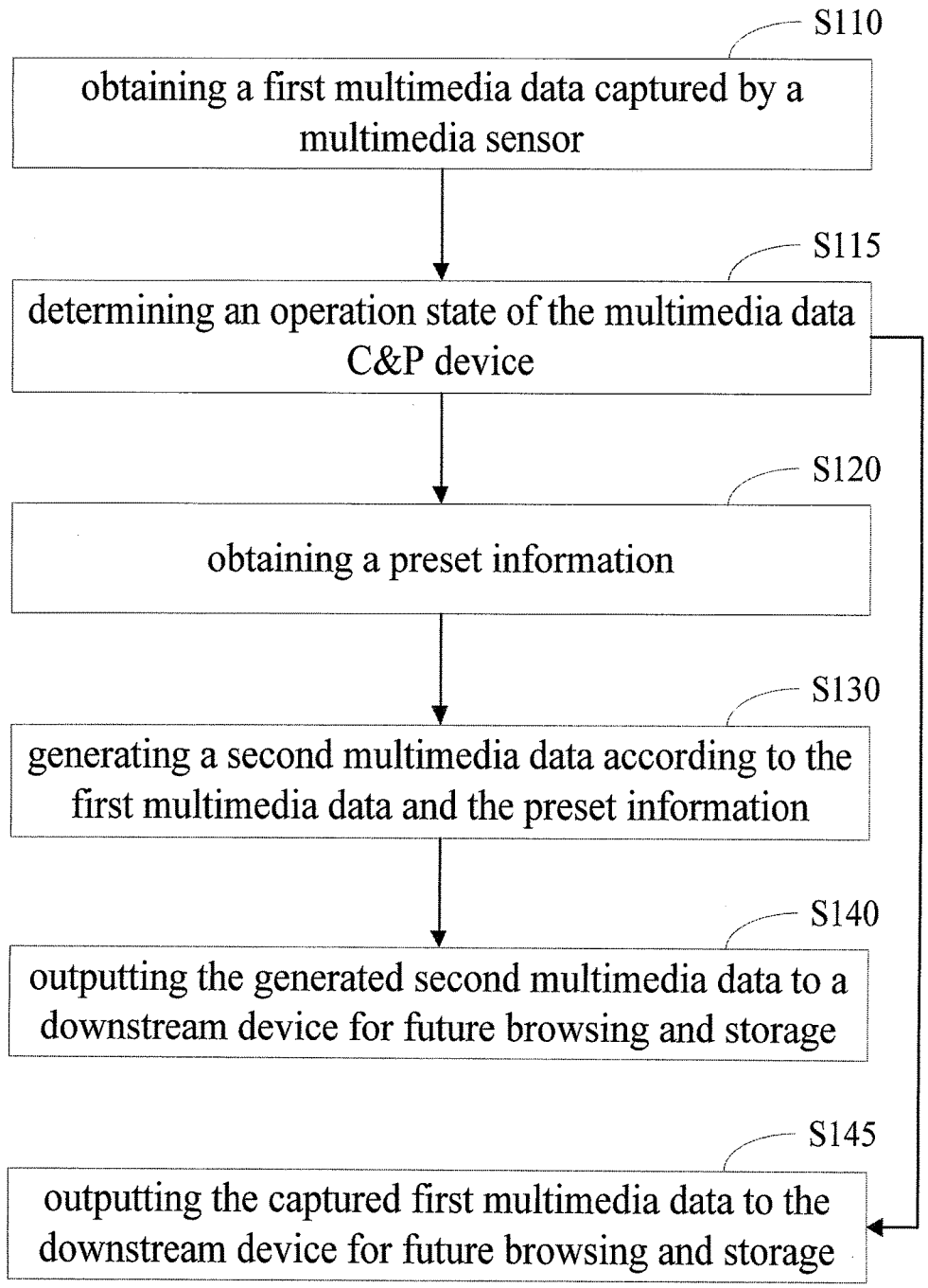
FIG. 1 is a flowchart depicting a multimedia data processing method according to an embodiment of the present application.

The multimedia data processing method shown in FIG. 1 can be applied to a multimedia data capture and processing (C&P) device, which may be used to obtain a multimedia data as required by a user and to further incorporate an preset additional information into the obtained multimedia data as required by the user or someone else so as to increase the added value of the obtained multimedia data, to provide a wider range of user enjoyment, to assure a higher level of user convenience, and the like. For example, a manufacturer of the multimedia data C&P device may expect to embed its name and/or trademark logo into the multimedia data obtained by its device for product promotion.

As shown in FIG. 1, the multimedia data processing method includes:

in step S110, obtaining a first multimedia data (e.g. audio, photo, video) captured by a multimedia sensor (e.g. a sound sensor, an image sensor);

in step S120, obtaining a preset information (e.g., embedded content such as an advertisement); and in step S130, generating a second multimedia data according to the first multimedia data and the preset information, at least a part of the second multimedia data presenting the preset information.

In one embodiment, before step S110, the multimedia data processing method can further include receiving from a user a multimedia data capturing instruction for capturing a user scene. In other word, the multimedia data capturing instruction is used for capturing the first multimedia data, which may be an original presentation of the scene around the user.

For example, the multimedia data capturing instruction may be a sound capturing instruction used to record a sound of the user scene, an image capturing instruction used to take a photo of the user scene, a video capturing instruction used to capture a video of the user scene, or the like. For example, the multimedia data capturing instruction may be issued by the user who is operating a user terminal (e.g., a sound recorder, a still camera, a video camera, a mobile phone, a tablet, and so on) equipped with the multimedia data C&P device.

Then, the multimedia data processing method can further include: in response to receiving the multimedia data capturing instruction, capturing the first multimedia data by using the multimedia sensor equipped in the multimedia data C&P device. In particular, a sound sensor can be utilized to capture the audio of the user scene, an image sensor can be utilized to capture the photo of the user scene, and both sensors can be utilized in combination to capture the video of the user scene.

For example, the sound sensor can be a microphone; and the image sensor can be a video camera tube, a semiconductor charge-coupled device (CCD), an active pixel sensor in complementary metal-oxide-semiconductor (CMOS) or N-type metal-oxide-semiconductor (NMOS), or the like.

Then, the first multimedia data captured by a multimedia sensor is obtained in step S110 for being used in the following steps. Before step S110, after it, or simultaneously with it, the preset information is obtained in step S120.

In the present application, the preset information can be any kind of additional information that needs to be incorporated into the captured first multimedia data. For example, the content of the preset information may be an advertisement, a message, or the like. In particular, the preset information may be used to show the name of the manufacturer of the multimedia sensor (or the manufacturer of the multimedia data C&P device, or even the manufacturer of a user terminal equipped with the device) currently being used by the user, a brief introduction of the captured scene, weather and location information of the scene, or simply a piece of advertising slogan provided by some other advertiser. Additionally, the preset information can be of any data format. For example, the preset information may be a piece of plain-text information (e.g., an advertising slogan), or a piece of multimedia information such as an image (e.g., a logo image), a sound clip, a video clip, or the like.

Furthermore, the preset information can be selected from a plurality of candidate information stored in a first memory equipped in the multimedia data C&P device or downloaded from an internet cloud database (if internet access is available). That is, an embedded content memory can be used in the multimedia data C&P device to record the embedded contents into the device, which includes but not limited to some text, logo images, as well as a unique ID for each device. For example, an one-time programmable memory (OTP) is normally used as the first memory for recording the embedded content. However, the present application is not limited to this. Instead, the first memory may be any readable storage medium including a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In particular, the preset information may be selected randomly or sequentially. Alternatively, the preset information may also be selected based on the content of the first multimedia data. For example, the candidate information whose content is relevant to the content of the first multimedia data is preferably selected as the preset information. To be specific, an advertisement for a travel agency may be more appropriate to be selected as the additional information to be incorporated into a picture showing a landscape, an advertisement for an automaker may be more appropriate to be selected as the additional information to be incorporated into a picture showing a car, an advertisement for a training institution may be more appropriate to be selected as the additional information to be incorporated into a picture showing a school, and so forth.

Next, in step S130, the second multimedia data is generated by combining the first multimedia data and the preset information.

Below, steps of the multimedia data processing method will be described in detail in various embodiments.

In a first embodiment in which the first multimedia data is any kind of multimedia data and the preset information obtained in step S120 is a plain-text information, step S130 can include: determining a first data format of the first multimedia data; converting the selected preset information into the third multimedia data according to the first data format of the first multimedia data; and combining the first multimedia data and the third multimedia data to generate the second multimedia data.

First, it is determined whether the first multimedia data is an audio, an image, a video, or the like. Second, the selected preset information is converted into the third multimedia data according to the first data format of the first multimedia data. For example, the preset information can be converted into the same data format with the first multimedia data. In particular, when the first multimedia data is an audio, an image or a video, the preset information can be converted into an audio clip, a small image or a video clip, respectively. Alternatively, the preset information can also be converted into other data format compatible with the first multimedia data. In particular, when the first multimedia data is a video, the preset information can be converted into an audio clip or a small image, instead of a video clip.

In order to convert the preset information of the plain-text format into the third multimedia data, the multimedia data processing method can further include obtaining a data format. The data format may be referred to a set of rendering parameters for the preset information. For example, when converting a plain text into an image to be incorporated into another image or a video, the data format may define at least one of a font, a color, a size, a style, a morphing effect, and/or the like; when converting a plain text into an audio to be incorporated into another audio or a video, the data format may define at least one of a tone, a dialect, a volume, a sandhi effect, and/or the like; and when converting a plain text into a video, the data format may define at least one of the above two sets and/or other useful parameters. For instance, the data format can be obtained from a plurality of candidate formats stored in a second memory equipped in the multimedia data C&P device. For example, a font library can be built into the multimedia data C&P device to store the related parameters for converting a text into an image.

In particular, the data format may be obtained randomly. Preferably, in order to get a better presentation effect, the data format may also be obtained based on the content of the first multimedia data. To do so, the multimedia data processing method can further include analyzing the content of the first multimedia data. For an audio, the analysis operation includes at least one of a tone analysis, a style analysis, a volume analysis, and/or the like. For an image, the analysis operation includes at least one of a hue analysis, an object analysis, a dimension analysis, a location analysis, and/or the like. For a video, the analysis operation includes at least one of the above two sets. Then, according to the analysis result, the data format which makes the third multimedia data relevant to the content of the first multimedia data is selected.

Subsequently, the third multimedia data is generated according to the preset information and the obtained data format. In particular, the obtained data format is used to render the preset information so as to generate the third multimedia data which will have a better presentation effect when being incorporated into the first multimedia data. For example, if the captured first multimedia data is a photo taken in a strong light, a dark color may be used for displaying an advertising slogan in the photo; and if the captured first multimedia data is a photo taken in a weak light, a light color may be used for displaying the advertising slogan in the photo, so as to make the appearance of the preset additional information more noticeable. Additionally, if the captured first multimedia data is a record of light music, a gentle voice of a woman may be used for reading out the name of the music in the sound clip; and if the captured first multimedia data is a record of heavy metal music, a wild voice of a man may be used for reading out the name of the music in the sound clip, so as to make the additional voice in harmony with the original music.

It should be noted that the above examples are just illustrative, and the present application is not limited to this. Different data formats may be selected to render the preset information in accordance with different user requirements. For example, it is also feasible to use a light color to render an advertising slogan in a photo taken in a strong light and use a dark color to render the advertising slogan in a photo taken in a weak light so as to let the preset additional information blend into the first multimedia data smoothly without being excessively obtrusive.

Figure 2:
FIG. 2 illustrates an example of step S130 according to a first embodiment of the present application.
Figure 2:

FIG. 2 illustrates an example of step S130 according to a first embodiment of the present application. In this first example, the first multimedia data is an image and the preset information obtained in step S120 is a plain-text information.

As shown on the top of FIG. 2, the user takes photo shot by using the image sensor within the multimedia data C&P device, and the first multimedia data is a landscape picture captured by a user. In order to add value to the content of the captured image, an additional text of "sponsored by: CST", in which "CST" may be the device manufacturer's name or some person's initials, is expected to be inserted into the first multimedia data. For this, a text-to-image conversion operation is performed on the text information to generate a small image as the third multimedia data. For example, a text-to-image conversion engine can be used in the device. It uses the data from font library and the embedded content memory, and generates a small image to be displayed. Then, the insert position of the third multimedia data in the first multimedia data is determined. Typically, the insert position may be one corner of the first multimedia data. Then, as shown on the bottom of FIG. 2, the embedded content and the captured photo go to an image overlay combination engine, so that the third multimedia data is inserted into the first multimedia data at its bottom right corner, that is, the main image and the embedded content are combined into one whole output image.

Figure 3:
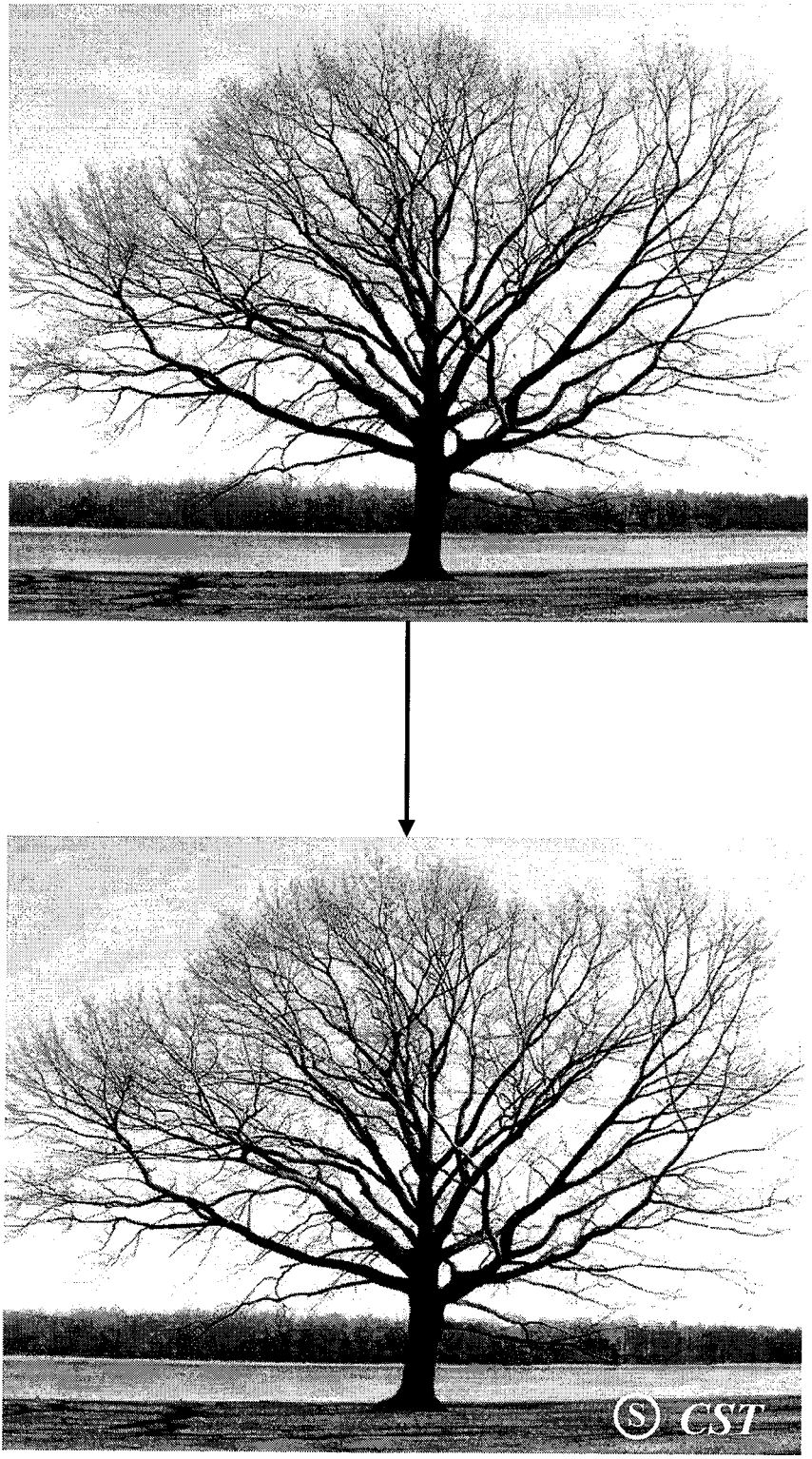
FIG. 3 illustrates another example of step S130 according to a first embodiment of the present application.

FIG. 3 illustrates another example of step S130 according to a first embodiment of the present application. In this second example, the same as the first example, the first multimedia data is an image and the preset information obtained in step S120 is a plain-text information.

By comparing FIG. 3 with FIG. 2, it can be seen that the additional text of "sponsored by:" as shown in FIG. 2 is substituted with a shorted symbol of "S" surrounded with a circle in FIG. 3. In this way, the embedded text looks shorter and nicer, and thus its impact on the captured image is significantly decreased. For example, in addition to "sponsored by:", the symbol can also represent other user-defined meanings, such as "supported by:", "SensCast" (the trademark or abbreviation of the device manufacturer's core technology used in this device), or the like.

It should be noted that although the insert position is exemplified as one corner of the captured image, the present application is not limited to this. The insert position may also be any other position of the captured image. For example, the insert position may be such as the center of the captured image so as to draw people's attention easily. Additionally, the additional text information may also be inserted in several positions instead of one.

Below, still another example of the first embodiment is described, in which the first multimedia data is an audio and the preset information obtained in step S120 is a plain-text information. In this third example, a text-to-audio conversion operation is performed on the text information to generate an audio clip as the third multimedia data. For example, the generated audio clip may have the same play time with the captured audio, and be combined with the captured audio by taking the generated audio clip as a background audio (e.g., having a louder volume) and taking the captured audio as a foreground audio (e.g., having a lower volume). Alternatively, the generated audio clip may have a play time less than the captured audio. In this case, the insert position in the first multimedia data needs to be determined. For example, the generated audio clip may be inserted into the captured audio once at some point in time, or several times at predetermined intervals or even randomly.

Apparently, this embodiment is also applicable when the first multimedia data is a video. Specifically, the process of inserting a text information into a video is substantially the same with that in the first or second example. Furthermore, in addition to a still image, an audio clip or a video clip having a certain play time can also be inserted into the video. For example, the audio clip can be obtained in the same way as mentioned in the third example, and the video clip can be obtained by performing a series of deformation to the still image or directly generated from the plain text by using a text-to-video conversion. Furthermore, the still image or the video clip converted from a plain text may be inserted at predetermined intervals of the original video or during its whole time.

In a second embodiment in which the first multimedia data is a multimedia data and the preset information obtained in step S120 is a multimedia data compatible with the first multimedia data, in order to obtain such an appropriate multimedia data, step S120 can include: determining a first data format of the first multimedia data; selecting the preset information having a suitable multimedia format according to the first data format of the first multimedia data; and taking the selected preset information as the third multimedia data to be incorporated into the first multimedia data.

First, it is determined whether the first multimedia data is an audio, an image, a video, or the like. Second, the preset information can be selected from a plurality of candidate information having different multimedia formats stored in the first memory or in a remote server according to the first data format of the first multimedia data. For example, the preset information can be multimedia information having the same data format with the first multimedia data. In particular, when the first multimedia data is an audio, an image or a video, the preset information may be an audio clip, a small image or a video clip, respectively. Alternatively, the preset information can also be multimedia information having other data format compatible with the first multimedia data. In particular, when the first multimedia data is a video, the preset information can be an audio clip or a small image instead of a video clip. In various embodiments, the selection of the preset information may be performed randomly, sequentially, or based on the content of the first multimedia data. Then, the selected preset information is taken as the third multimedia data to be incorporated into the first multimedia data in the following steps.

Figure 4:
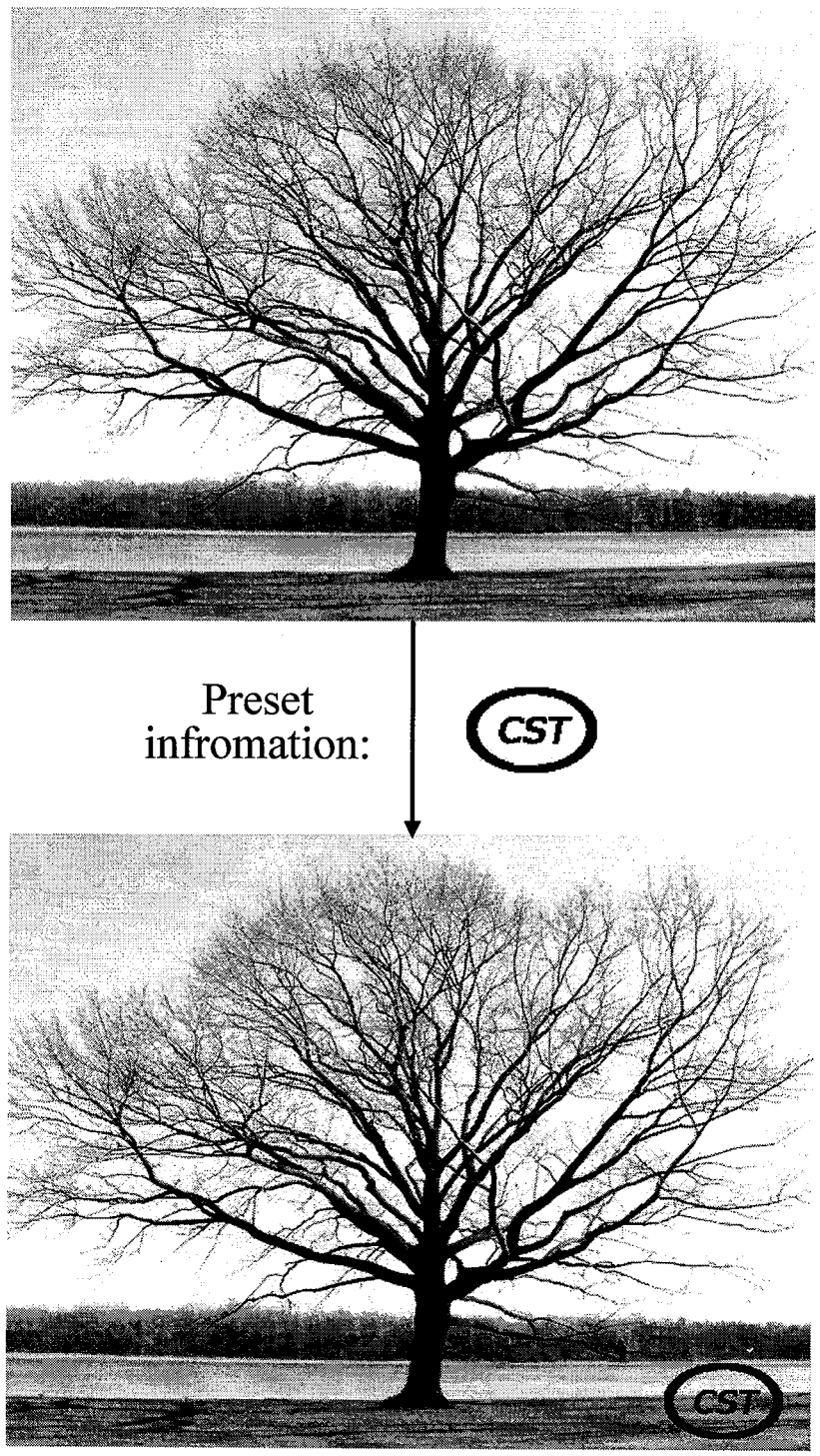
FIG. 4 illustrates an example of step S130 according to a second embodiment of the present application.

Next, step S130 can include: combining the first multimedia data and the third multimedia data to generate the second multimedia data. FIG. 4 illustrates an example of step S130 according to a second embodiment of the present application. In this example, the first multimedia data is an image and the preset information obtained in step S120 is a logo image.

As shown on the top of FIG. 4, the first multimedia data is a landscape picture captured by a user. In order to add value to the content of the captured image, an additional logo image showing an ellipse encircling a text of "CST", which may be the device manufacturer's trademark or other message, is expected to be inserted into the first multimedia data. Since it is an image, it can be directly taken as the third multimedia data without any conversion. Then, the insert position in the first multimedia data is determined. Typically, the insert position may be one corner of the first multimedia data.

Then, as shown on the bottom of FIG. 4, the third multimedia data is inserted into the first multimedia data at its bottom right corner. It should be noted that although the insert position is exemplified as being one corner of the captured image, the present application is not limited to this. The logo image may be inserted at the center or other place(s) of the captured image so as to draw people's attention easily or on the contrary to not seem too obtrusive. Since the insert operation in the second embodiment is substantially the same as that in the first embodiment, the detail is omitted.

It can be seen that in the above embodiments, it is to embed an additional information into the captured first multimedia data, for example, to put a nice, small advertisement at one corner of an image. The embedded content can be anything informational, e.g. "Sponsored by CST", or "CST inside", or a nice company logo, or a website name like "CistaInc.com", etc.

In some embodiments, the above steps S110-S130 can be repeated to produce many customized audios, images, videos, or the like with embedded contents. In one example, the above procedure can be repeated to produce many customized images with embedded contents.

After step S130, the multimedia data processing method can further include: in step S140, outputting the generated second multimedia data to a downstream device for future presentation and storage. For example, the downstream device may be a displayer, a speaker, a memory, or any combination thereof.

Furthermore, in one embodiment, not like the owner of the additional information, the user who possesses the user terminal equipped with the multimedia data device may not want to embed any additional information in his captured multimedia data so as to keep the multimedia data clean. In this case, the multimedia data processing method can further include: receiving an unlock code; comparing the unlock code to a predetermined key; and stops generating the second multimedia data if the unlock code is consistent with the predetermined key. For example, if the user would like to capture a multimedia data exactly the same as the user scene, he can buy an unlock code as a decrypt key from the owner of the additional information (e.g., the manufacturer of the multimedia data C&P device, some advertiser, some advertising agency, or the like) through the online service and input the unlock code into the multimedia data C&P device to unlock the device. Preferably, the unlock code is unique for each device. For example, it can be associated with an identifier (e.g., a serial number) of the multimedia data C&P device. Then, the inputted unlock code is compared to the predetermined key which is for example stored in the first memory. If the unlock code is the same as the predetermined key, the multimedia data processing method will not perform steps S120-S140 from now on.

To do this, two different operation states may be distinguished in the multimedia data C&P device. For example, a flag bit set in the first memory may be used to indicate the state of the multimedia data C&P device. The flag bit of "0" denotes that the multimedia data C&P device is operated in a "locked" state, and steps S120-S140 shall be performed every time the multimedia data C&P device is used to capture a multimedia data; and the flag bit of "1" denotes that the multimedia data C&P device is operated in an "unlocked" state, and steps S120-S140 shall be skipped.

In this case, the multimedia data processing method may further include: in step S115, determining an operation state of the multimedia data C&P device; if it is determined that the multimedia data C&P device is operated in the "locked" state, performing steps S120-S140 to output the generated second multimedia data to the downstream device; and if it is determined that the multimedia data C&P device is operated in the "unlocked" state, performing step S145 to output the captured first multimedia data to the downstream device, for future presentation and storage.

Although it is described that the step of determining the operation state is performed after step S110, the present application is not limited to this. The step can also be performed before step S110 or simultaneously with it. Additionally, although the unlock code is described as a permanent key, the unlock code can also be used as a temporary key which only enables the multimedia data C&P device to stay in the "unlocked" state for a predetermined time period or for a predetermined number of times of multimedia data capturing operations.

Thus, it can be seen that, adopting the multimedia data processing method according to the present application, it is possible to obtain a first multimedia data captured by a multimedia sensor, obtain a preset information, and generate a second multimedia data according to the first multimedia data and the preset information so that at least a part of the second multimedia data can present the preset information. Therefore, in the present application, upon capturing a multimedia data by a multimedia sensor, various types of additional information such as an advertisement, a message and translation text can be directly inserted into the captured multimedia data without any post-processing.

In view of the fact that most of today's companies need to find a way to advertise their brand or products to a wide range of potential customers, in an example, the following application scenario of the multimedia data processing method according to the present application may be particularly useful: a device manufacturer may use the above-mentioned multimedia data processing method to develop multimedia data C&P devices designed to incorporate third party advertisers' advertisement into every multimedia data captured by the device, so that the advertisers' brands or products can be promoted to a wide range of potential customers who possess the devices and have access to the captured multimedia data.

Figure 5:
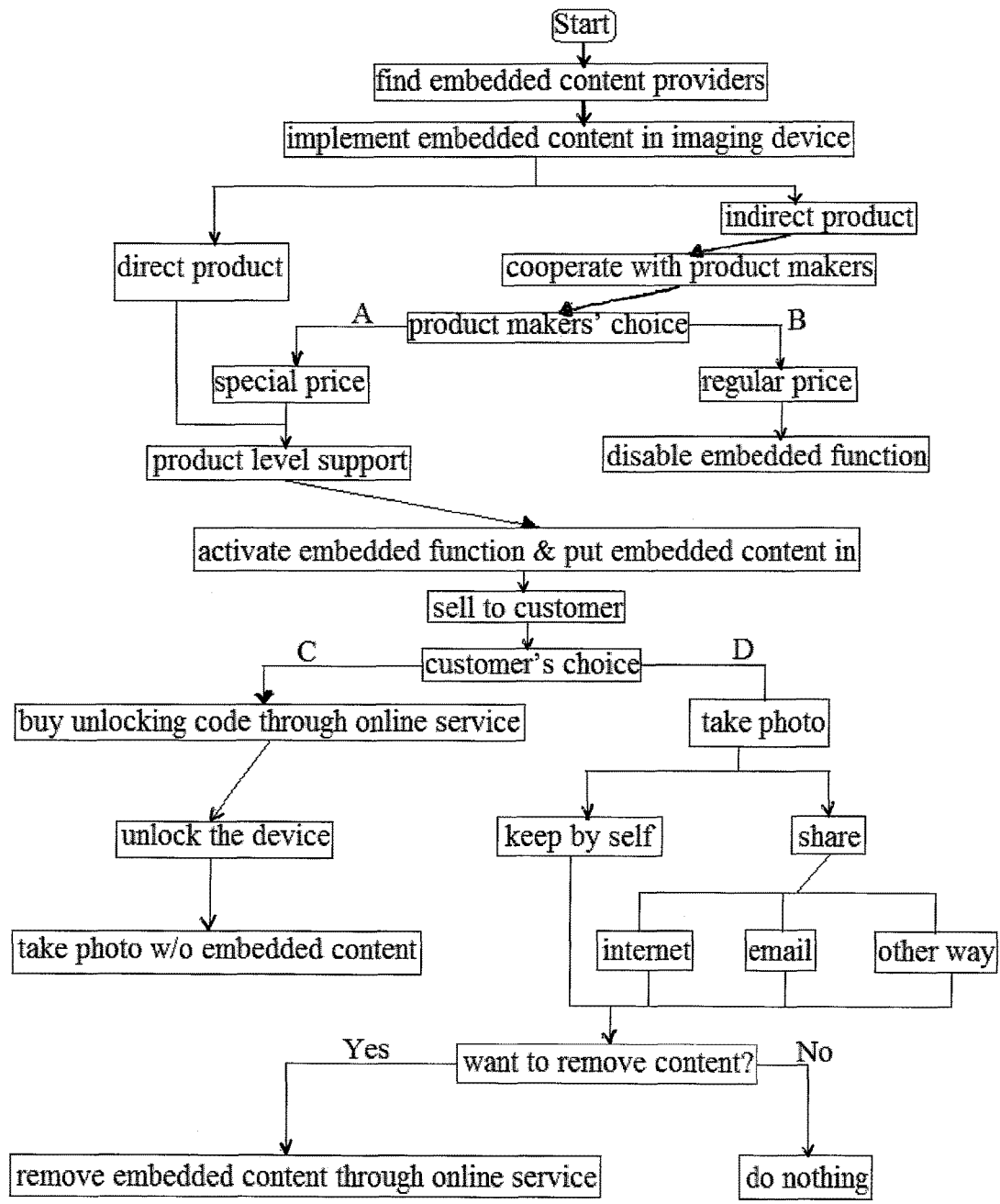
FIG. 5 is a flowchart depicting an application scenario of applying the multimedia data processing method according to an embodiment of the present application.

FIG. 5 is a flowchart depicting an application scenario of applying the multimedia data processing method according to an embodiment of the present application. For ease of description, below, an imaging device is taken as an example of the multimedia data C&P device. That is to say, the multimedia data processing method according to an embodiment of the present application is to use mobile imaging device as a platform to broadcast advertisement.

As shown in FIG. 5, the first step for the device manufacturer to do is to find some companies or advertisers who are willing to pay and use its device for advertising. Then their advertisements are implemented into the imaging device as the embedded contents (also called as additional information), using the multimedia data processing method illustrated in FIG. 1 and described above.

In one example, the imaging device may be put by the device manufacturer into direct products, which will be sold to end-users directly. Alternatively, the imaging device may also be put into in-direct products, which will be integrated into an apparatus at higher level (such as sound recorders, still cameras, and video cameras, mobile phones, and so on) before selling to end-users. For indirect product, cooperation between the manufacturer and the product maker is needed. Let's note the manufacturer is company X, and the product maker is company Y. Normally, the company Y buys the imaging device as a component from company X and integrates it into a higher level apparatus, which is the direct product to be sold to end-users. It is company Y's choice to choose the component with embedded contents (option A) or without embedded contents (option B). If company Y chooses option B, then it will get components in which the embedded function is disabled by company X at a regular price as usual, in other words, it will get traditional components at the regular price. If company Y chooses option A, then it will get components at a special price, which may be significantly lower than regular prices. The difference between the special price and regular price is mainly paid by the advertisers. Then, company X will support company Y in product level on how to integrate the embedded function in. This is the same as if company X builds direct product by itself, which needs to have product level support and integrate the embedded function in. The next thing to do is to activate the embedded function and put embedded contents in. After that, the products will be sold to the end-users, or customers.

At this stage, it is the customers' choices that if they want to keep this embedded function or not. If they choose option C, which means that they do not like there's additional contents embedded in the photos that they have captured, then they can just buy an unlocking code as a decrypt key through the online service and unlock the device. The online service may be accessible through a website, or from an app installed in the product. After that, the customer can capture photos without any embedded contents. On the other hand, if they choose option D, then in some or all of the photos they have captured, additional contents will be embedded. Some of the photos will be just kept by themselves. But some other photos will be shared through internet, email, or other ways. Thus, the advertisements embedded in the photos can be broadcast as wide as possible, the broadcast effect can last for a longer time, and the broadcast cost is substantially minimized because of the following reasons. First, the usage of the imaging device is very wide. Nearly every person is equipped with a cellphone, which means there may be billions of customers. Photo sharing through internet multiplies the broadcasting range by a factor of M_sharing. Second, image sensor technology is relatively mature and widely used, which makes it a low-cost commodity, especially in mobile applications. This provides an inexpensive platform to integrate advertisement in. Third, good photos can be saved and cherished for many years or even forever.

Even after the photo is captured, it is still possible to remove the embedded content if customers prefer. To do so, they can upload them onto an online service website for example hosted by the device manufacturer to have the embedded content removed. To achieve that, special image data format may be necessary, which hides the original image data of the area of the embedded content display area in the image data file but in an encrypted way. Only the software or algorithm knowing the related decrypt key can unlock and recover it. A small amount of fee may be charged for this online service.

In the case that end-users keep the embedded contents, the advertiser companies pay the full amount of the advertisements to company X. Otherwise, in the case that end-users purchase the decrypt key and disable the embedded contents, part of the income will be reimbursed to the advertisers so that the advertiser companies only pay for the amount that the embedded contents are actually broadcasted.

Below, a comparison of the estimated average broadcasting cost between several methods is described. Taking a simple example, a US stamp costs about 48 cents. Many companies use mails to connect to potential customers. However, a mail can only go to one customer, and only for one time. A typical image sensor chip costs only 70 cents, which is cheaper than two US stamps. When putting into a cellphone, each sensor can take hundreds or thousands of pictures. Let's note this as multiply factor M1. Some of the pictures will be shared through internet and may be viewed by hundreds or even thousands of people. Let's note the average photo numbers to be shared over the total numbers of photos taken as sharing ratio R1, and note the average times of each shared photo be viewed as viewing multiply factor M2. In addition, some of the photos will be saved and viewed for a long time, which equivalents to another multiply factor. Let's note it as time-span multiply factor M3.

Figure 6:
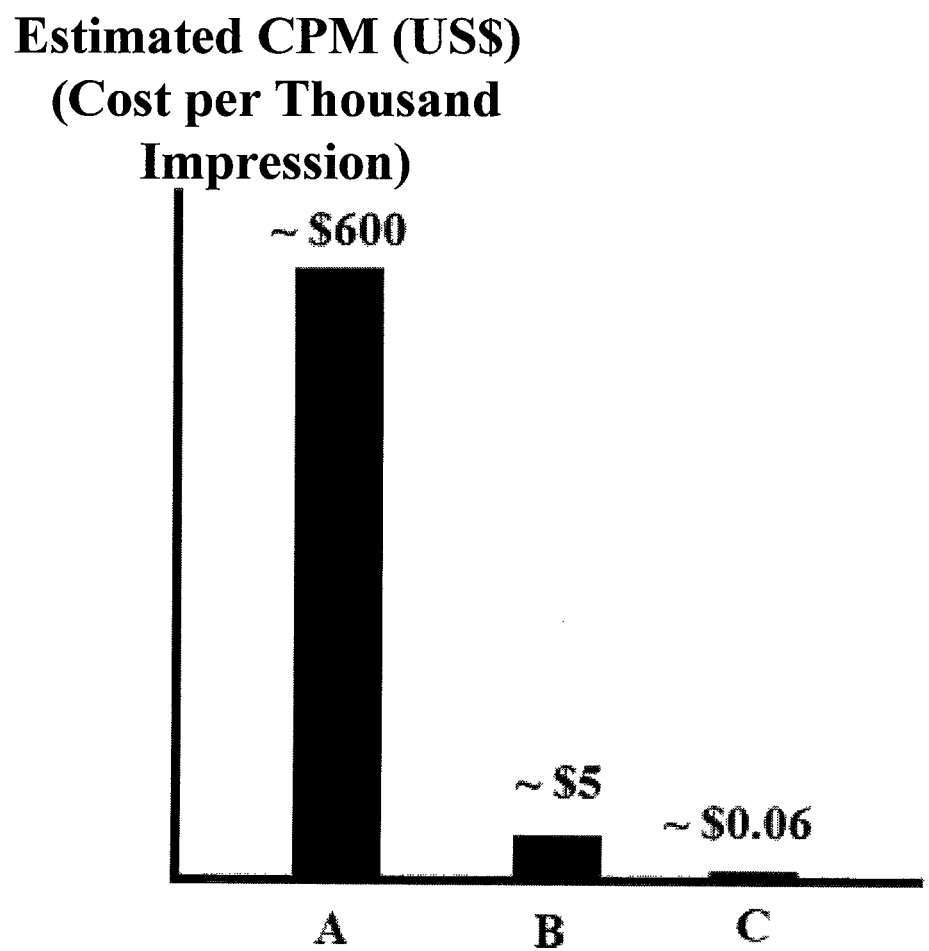
FIG. 6 is a bar chart (not to scale) demonstrating the comparison of the estimated average broadcasting cost between several methods.

The average cost for the traditional US-Mail advertisement, assuming 12 cents for the envelope, materials and handling, 48 cents for the mailing, is 60 cents per broadcast. In comparison, assuming we spend 60 cents in one image sensor with integrated advertisement, the average cost is: 60 cents/(1+M1*R1*M2*M3) per broadcast. For a conservative estimation, let's assume M1=1000, R1=5%, M2=100, M3=2, then the cost per broadcast will be: 60/(1+1000*0.05*100*2)≈0.006 cents, which is ten thousand times less than the traditional way. FIG. 6 is a bar chart (not to scale) showing the comparison of the estimated average broadcasting cost between several methods.

As shown in FIG. 6, it can be seen from a brief comparison of estimated CPM (cost per thousand impression) between three different ways of advertisement that, as of today, Google internet ads (denoted as "B") roughly costs about 100 times less than traditional US mail ads (denoted as "A"), while the method of the present application (denoted as "C") costs about 100 times less than internet ads to reach the same amount customers. FIG. 6 is present merely for an illustration purpose. It does not necessarily reflect the real cost, which will be eventually determined by fair market competition.

It should be noted that the present application is not limited to this. In another alternative solution, imaging devices with embedded contents can be made by third party companies, as permitted by the license from company X. Company X does not have to limit what specific technologies are used when implementing this invention in different application platforms.

Figure 7:
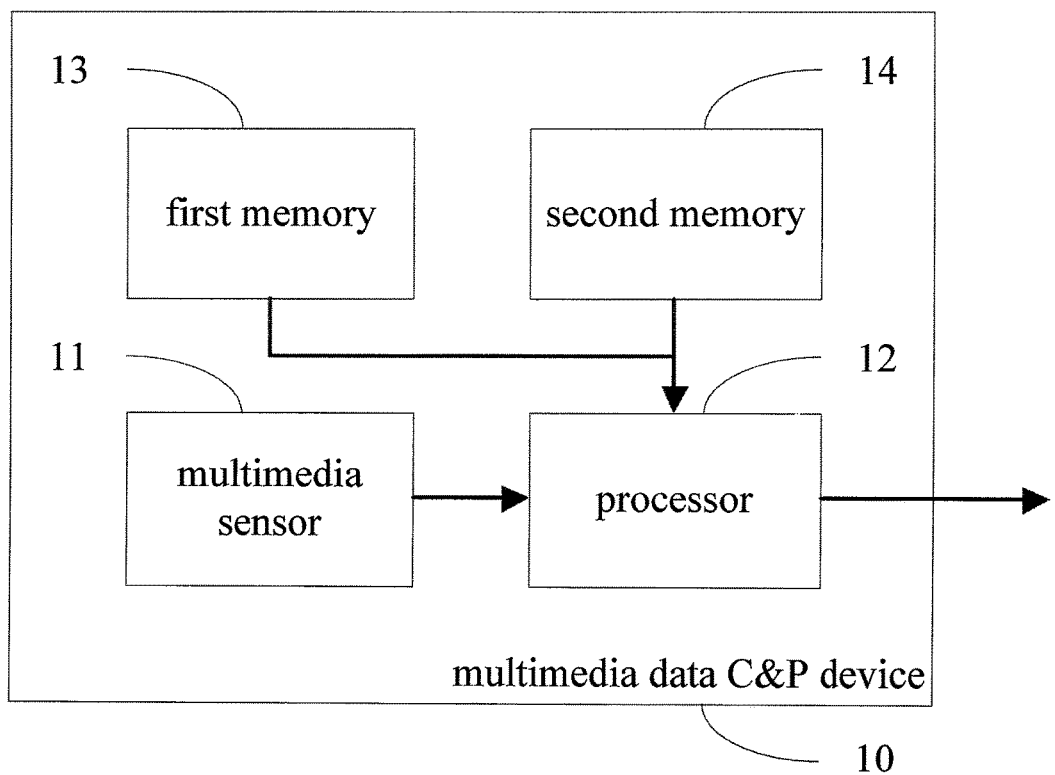
FIG. 7 is a block diagram depicting a multimedia data capture and processing (C&P) device according to an embodiment of the present application.

Hereinafter, a multimedia data C&P device according to an embodiment of the present application will be described with reference to FIG. 7. FIG. 7 is a block diagram depicting a multimedia data C&P device according to an embodiment of the present application.

As shown in FIG. 7, the multimedia data C&P device 10 includes:
- a multimedia sensor 11 configured to capture a first multimedia data; and
- a device processor 12 (e.g. image overlay combination engine) configured to obtain a preset information, and generate a second multimedia data according to the first multimedia data and the preset information, at least a part of the second multimedia data presenting the preset information.

In one embodiment, the multimedia data C&P device further includes a first memory 13 configured to store one or a plurality of the preset information.

In one embodiment, the device processor obtains the preset information having a multimedia format which is compatible with that of the first multimedia data from a plurality of preset information stored in the first memory, and takes the obtained preset information as a third multimedia data.

In one embodiment, the device processor analyzes the content of the first multimedia data, and obtains the preset information whose content is relevant to that of the first multimedia data from the plurality of preset information; or the device processor randomly obtains the preset information from the plurality of preset information.

In one embodiment, the device processor generates the second multimedia data by combining the first multimedia data and the third multimedia data.

In one embodiment, in the case that the first multimedia data and the third multimedia data are both images or videos, or in the case that the first multimedia data is a video and the third multimedia data is an image, the device processor inserts the third multimedia data at one corner of the first multimedia data to generate the second multimedia data.

In one embodiment, in the case that the first multimedia data and the third multimedia data are both audios, or in the case that the first multimedia data is a video and the third multimedia data is an audio, the device processor inserts the third multimedia into the first multimedia data at predetermined intervals to generate the second multimedia data.

In one embodiment, the multimedia data C&P device further includes a second memory 14 configured to store one or a plurality of data formats.

In one embodiment, the device processor obtains a data format from the plurality of data formats randomly or based on the content of the first multimedia data, generates a third multimedia data according to the preset information having a plain-text format and the obtained data format, and generates the second multimedia data by combining the first multimedia data and the third multimedia data.

In one embodiment, wherein in the case that the first multimedia data is an image or a video, the device processor masks the first multimedia data according the preset information.

In one embodiment, the device processor receives an unlock code, compares the unlock code to a predetermined key, and stops generating the second multimedia data if the unlock code is consistent with the predetermined key.

In one embodiment, the preset information is an advertising information.

The detailed configurations and operations of various units in the multimedia data C&P device according to the present application have been described in detail in the multimedia data processing method applied to the multimedia data C&P device and described with reference to FIG. 1, and thus details thereof are omitted.

Thus, it can be seen that, adopting the multimedia data C&P device according to the present application, it is possible to obtain a first multimedia data captured by a multimedia sensor, obtain a preset information, and generate a second multimedia data according to the first multimedia data and the preset information so that at least a part of the second multimedia data can present the preset information. Therefore, in the present application, upon capturing a multimedia data by a multimedia sensor, various types of additional information such as an advertisement, a message and translation text can be directly inserted into the captured multimedia data without any post-processing.

Figure 8:
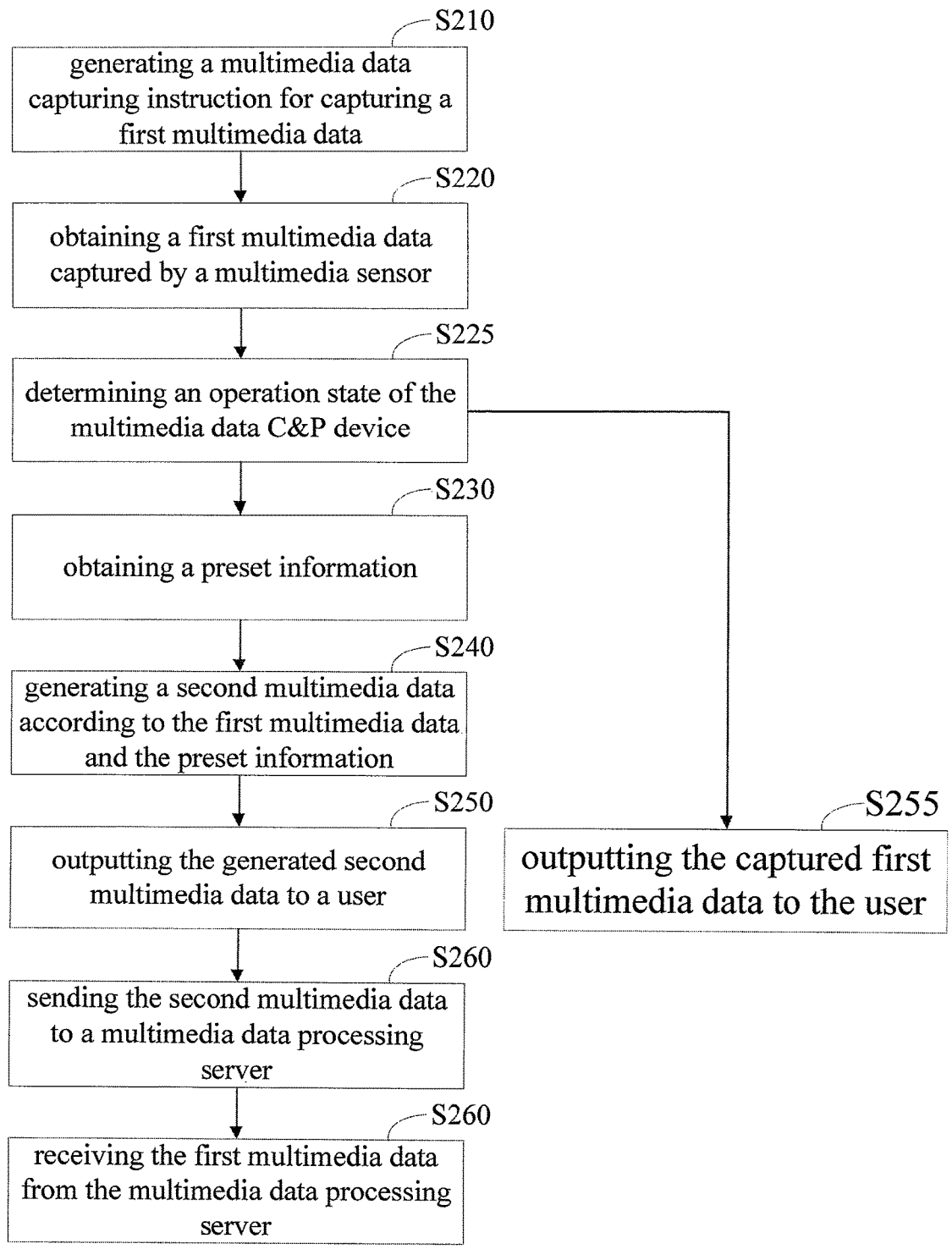
FIG. 8 is a flowchart depicting a multimedia data processing method according to an embodiment of the present application.

Hereinafter, a multimedia data processing method according to an embodiment of the present application will be described with reference to FIG. 8. FIG. 8 is a flowchart depicting a multimedia data processing method according to an embodiment of the present application. The multimedia data processing method shown in FIG. 8 can be applied to a user terminal such as a mobile phone, a tablet PC, a laptop, a desktop, a multimedia player, a personal digital assistant (PDA), or the like equipped with the multimedia data C&P device described with reference to FIG. 7.

As shown in FIG. 8, the multimedia data processing method includes:
- in step S210, generating a multimedia data capturing instruction for capturing a first multimedia data;
- in step S220, obtaining the first multimedia data captured by a multimedia sensor;
- in step S230, obtaining a preset information;
- in step S240, generating a second multimedia data according to the first multimedia data and the preset information, at least a part of the second multimedia data presenting the preset information; and
- in step S250, outputting the second multimedia to a user.

In one embodiment, before step S210, the multimedia data processing method can further include receiving from an input device a user operation for capturing a user scene.

For example, the input device may include a button (e.g., a shutter button) or a keypad used to detect a user operation as the user operates the button, a touch panel used to allow the user to enter operational instructions by touching the display panel, or the like.

Then, in step S210, a multimedia data capturing instruction for triggering the multimedia sensor equipped in a multimedia data C&P device to capture the first multimedia data is generated according to the user operation.

The next steps S220 to S240 are the same as steps S110 to S130 in the multimedia data processing method described with reference to FIG. 1, and thus details thereof are omitted.

After step S240, in step S250, the second multimedia data generated in the multimedia data C&P device is outputted to an output device equipped in the user terminal for presentation.

For example, the output device may include a display unit for displaying an image captured by the user and inserted with the preset information to the user, a speaker unit for play an audio captured by the user and inserted with the preset information to the user, or both for display a video captured by the user and inserted with the preset information to the user. As mentioned above, For example, the content of the preset information may be an advertisement, a message, or the like.

In one embodiment, the multimedia data processing method can further include: receiving an unlock code for disabling the generation of the second multimedia data.

For example, if the user does not want to embed any additional information in his captured multimedia data, he can buy an unlock code as a decrypt key from the owner of the additional information (e.g., the manufacturer of the multimedia data C&P device, some advertiser, some advertising agency, or the like) through the online service and unlock the device. The online service may be accessible through a website, or from an APP installed in the user terminal. If the user obtains the unlock code using another apparatus able to access the internet, such as a personal computer, he may input the unlock code into the multimedia data C&P device by using the input device (e.g., a keypad or a touch panel). Alternatively, if the user terminal is installed with the APP and able to access the website through a wired or wireless network interface, the unlock key may be directly sent to the multimedia data C&P device through a system bus between the network interface and the multimedia data C&P device.

Subsequently, in the multimedia data C&P device, the inputted unlock code is compared to the predetermined key which is for example stored in the first memory. If the unlock code is the same as the predetermined key, an operation state of the multimedia data C&P device is changed from a "locked" state into an "unlocked" state and the multimedia data processing method will not perform steps S230-S250 anymore.

In this case, the multimedia data processing method may further include: in step S225, determining an operation state of the multimedia data C&P device; if it is determined that the multimedia data C&P device is operated in the "locked" state, performing steps S230-S250 to output the generated second multimedia data to the user; and if it is determined that the multimedia data C&P device is operated in the "unlocked" state, skipping S230-S250 and performing step S255 to output the captured first multimedia data to the user.

In some case, the user of the user terminal may have an expectation to remove the additional information already embedded in his captured multimedia data so as to recover the original user scene.

Thus, in one embodiment, in order to enhance the user's experience, the multimedia data processing method can further include: in step S260, sending the second multimedia data to a multimedia data processing server for an inverse multimedia data processing; and in step S270, receiving the first multimedia data from the multimedia data processing server.

In step S260, the second multimedia data incorporated with the additional information is sent to the multimedia data processing server which is in communication with the user terminal for example via a wired or wireless network. The multimedia data processing server may perform an inverse multimedia data processing which is an inverse of processing used for incorporating the additional information in the captured multimedia data as performed in the multimedia data C&P device.

To achieve that, a special multimedia data format may be necessary, which hides the original multimedia data of the area of the embedded content display area in the multimedia data file but in an encrypted way. Only the software knowing the related decrypt key can unlock and recover it. A small amount of fee may be charged for this online service. Alternatively, the generated multimedia data may include two layers, a first layer presenting the original captured multimedia data, and a second layer on top of the first layer and presenting the incorporated additional information. Only the software knowing the related decrypt key can delete the second layer and remain the first layer.

Finally, in step S270, the inverse-processed multimedia data is received from the multimedia data processing server for future processing. For example, the received first multimedia data is outputted to an output device equipped in the user terminal for presentation to the user or stored in a storage device equipped in the user terminal.

Figure 9:
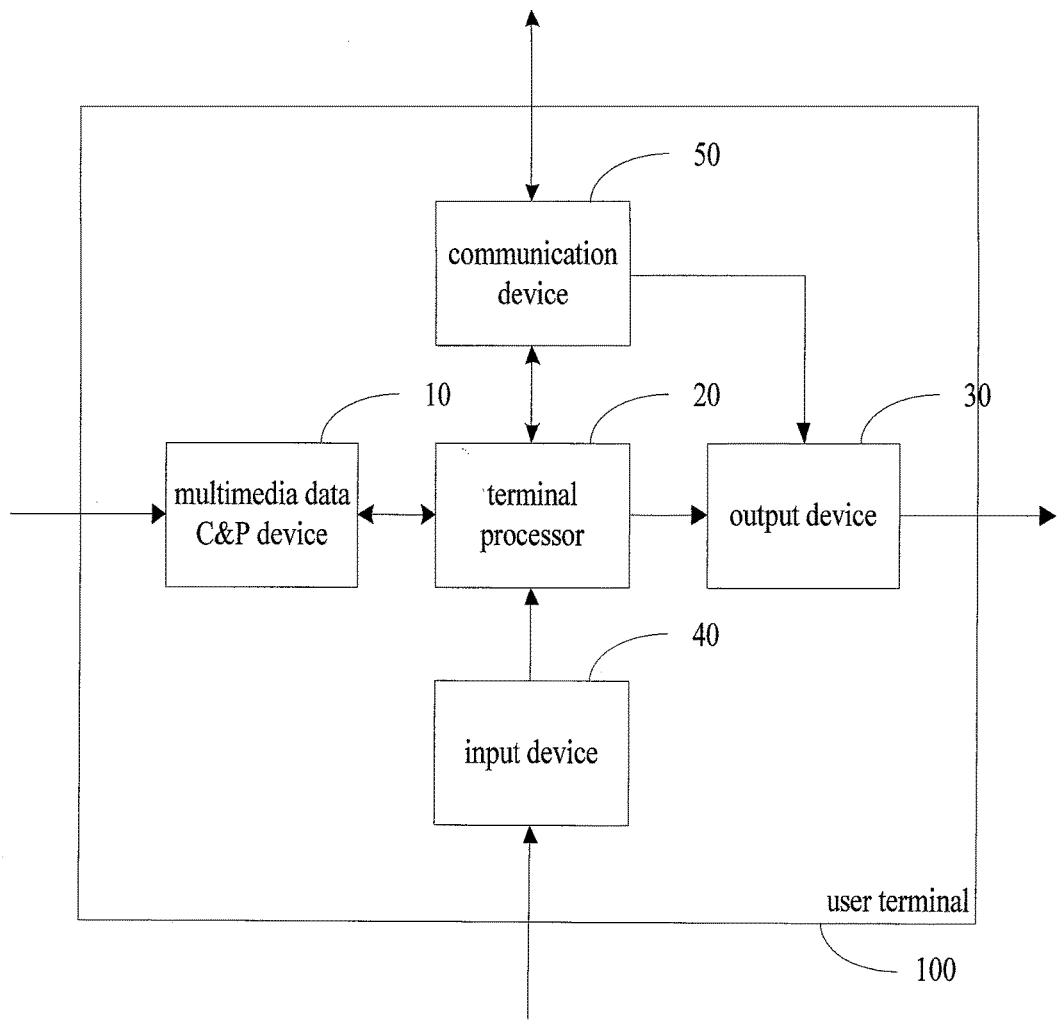
FIG. 9 is a block diagram depicting a user terminal according to an embodiment of the present application.

Hereinafter, a user terminal according to an embodiment of the present application will be described with reference to FIG. 9. FIG. 9 is a block diagram depicting a user terminal according to an embodiment of the present application.

As shown in FIG. 9, the user terminal 100 includes:
 a terminal processor 20 configured to generate a multimedia data capturing instruction for capturing a first multimedia data;
 a multimedia data C&P device 10 including a multimedia sensor configured to capture a first multimedia data, and a device processor configured to obtain a preset information, and generate a second multimedia data according to the first multimedia data and the preset information, at least a part of the second multimedia data presenting the preset information; and
 an output device 30 configured to output the second multimedia to a user.

In one embodiment, the user terminal 100 further includes an input device 40 configured to receive an unlock code for disabling the generation of the second multimedia data.

In one embodiment, the device processor compares the unlock code to a predetermined key, and if the unlock code is consistent with the predetermined key, the device processor stops generating the second multimedia data and directly sends the first multimedia data to the output device.

In one embodiment, the user terminal 100 further includes a communication device 50 in communication with a multimedia data processing server and configured to send the second multimedia data to the multimedia data processing server for an inverse multimedia data processing, and to receive the first multimedia data from the multimedia data processing server.

In one embodiment, the communication device is also in communication with an information server and further configured to receiving the preset information from the information server.

In one embodiment, the preset information is an advertising information.

The detailed configurations and operations of various units in the user terminal according to the present application have been described in detail in the multimedia data processing method applied to the user terminal and described with reference to FIG. 8, and thus details thereof are omitted.

Hereinafter, a multimedia data processing method according to an embodiment of the present application will be described with reference to FIG. 10.

Figure 10:
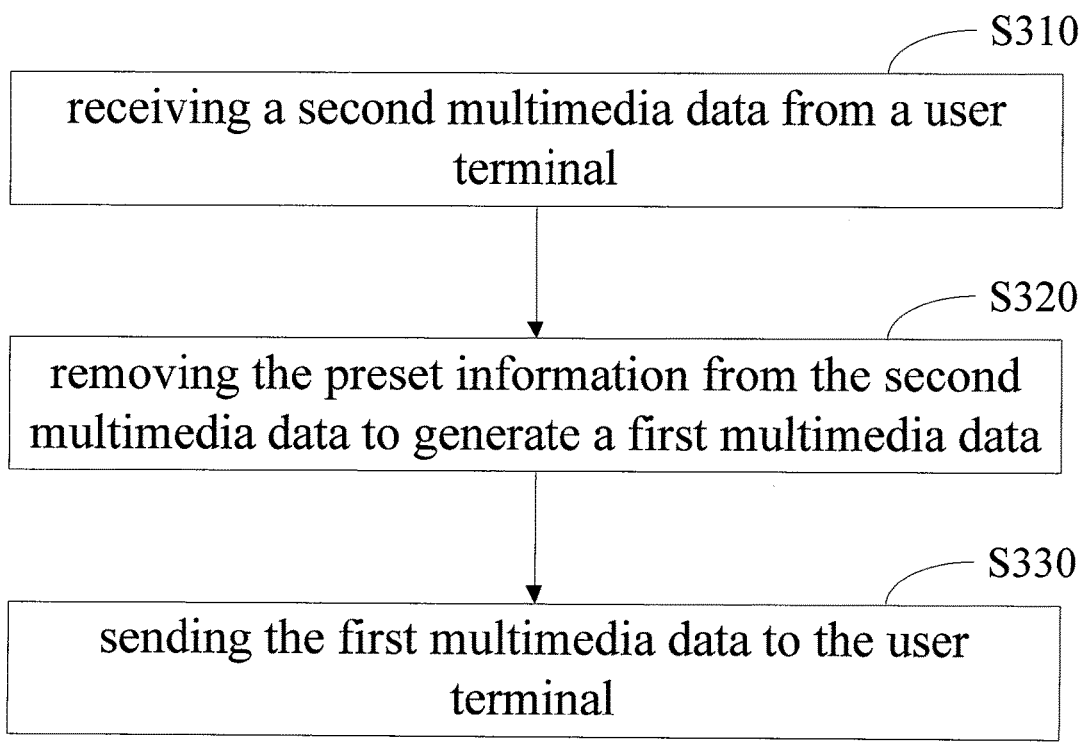
FIG. 10 is a flowchart depicting a multimedia data processing method according to an embodiment of the present application.

FIG. 10 is a flowchart depicting a multimedia data processing method according to an embodiment of the present application.

The multimedia data processing method shown in FIG. 10 can be applied to a multimedia data processing server which may be located at the end of the manufacturer of the multimedia data C&P device.

As shown in FIG. 10, the multimedia data processing method includes:
 in step S310, receiving a second multimedia data from a user terminal, at least a part of the second multimedia data presenting a preset information;
 in step S320, removing the preset information from the second multimedia data to generate a first multimedia data; and in step S330, sending the first multimedia data to the user terminal.

As mentioned above, in the case that a user of the user terminal wants to remove an additional information already embedded in his captured multimedia data so as to recover the original user scene, in step S310, the second multimedia data incorporated with the additional information is received from the user terminal which is in communication with the multimedia data processing server for example via a wired or wireless network.

Then, in step S320, the multimedia data processing server may perform an inverse multimedia data processing which is an inverse of processing used for incorporating the additional information in the captured multimedia data as performed in the multimedia data C&P device.

Finally, in step S330, the inverse-processed multimedia data is sent back to the user terminal for future processing.

In one embodiment, in exchange of removing the inserted additional information, the user may need to bear the cost of this inverse multimedia data processing.

In this case, step S320 can include: verifying whether a payment has been received from the user terminal, and removing the preset information from the second multimedia data when it is verified that the payment has been received.

Hereinafter, a multimedia data processing server according to an embodiment of the present application will be described with reference to FIG. 11.

Figure 11:
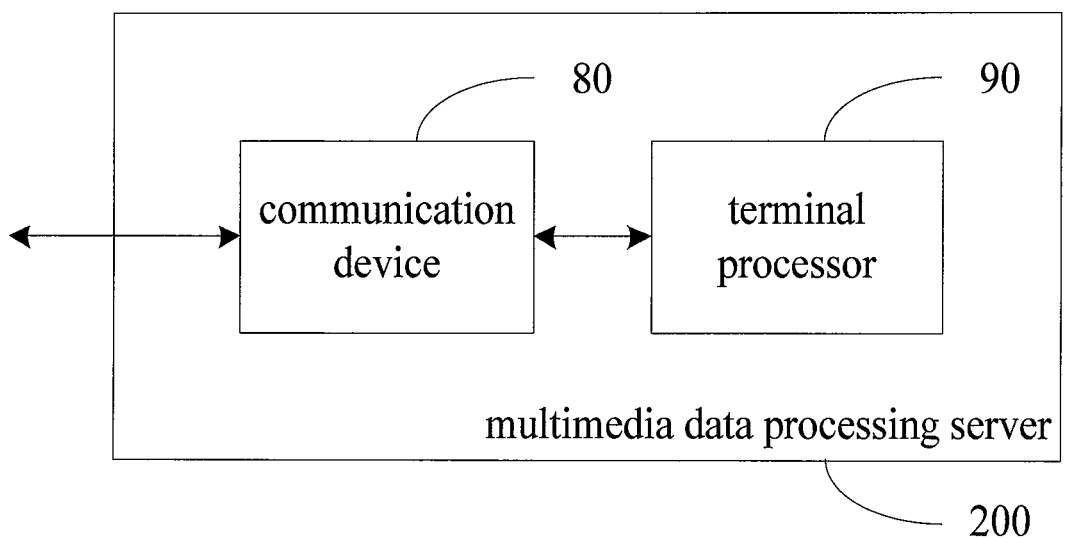
FIG. 11 is a block diagram depicting a multimedia data processing server according to an embodiment of the present application.

FIG. 11 is a block diagram depicting a multimedia data processing server according to an embodiment of the present application.

As shown in FIG. 11, the multimedia data processing server 200 includes:
  a communication device 80 in communication with a user terminal and configured to receive a second multimedia data from the user terminal, at least a part of the second multimedia data presenting a preset information; and
  a server processor 90 configured to remove the preset information from the second multimedia data to generate a first multimedia data,
  the communication device being further configured to send the first multimedia data to the user terminal.

In one embodiment, the multimedia data processing server 200 further includes: a verifying device configured to verify whether a payment has been received from the user terminal, and instruct the server processor to remove the preset information from the second multimedia data when it is verified that the payment has been received.

The detailed configurations and operations of various units in the user terminal according to the present application have been described in detail in the multimedia data processing method applied to the multimedia data processing server and described with reference to FIG. 10, and thus details thereof are omitted.

Hereinafter, a method for facilitating transactions according to an embodiment of the present application will be described with reference to FIG. 12.

Figure 12:
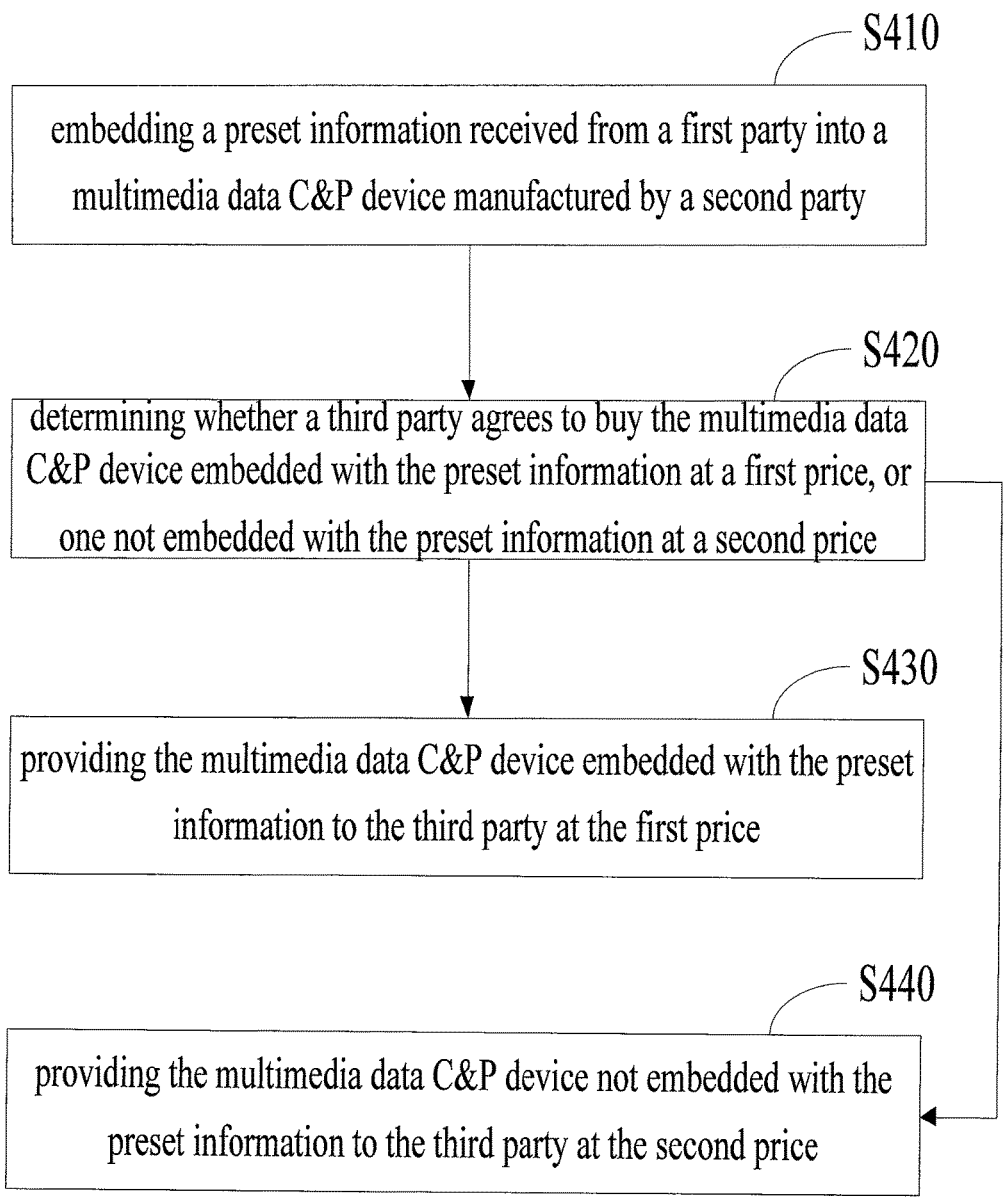
FIG. 12 is a flowchart depicting a method for facilitating transactions according to an embodiment of the present application.

FIG. 12 is a flowchart depicting a method for facilitating transactions according to an embodiment of the present application.

The method for facilitating transactions may be a computer based method for facilitating transactions between different parties and can be applied to a computing apparatus. For example, the computing apparatus may be located on the side of a manufacturer who can produce the multimedia data C&P device according to the present application.

As shown in FIG. 12, in a first aspect, the computer based method for facilitating transactions includes:
  in step S410, embedding a preset information received from a first party into a multimedia data C&P device manufactured by a second party, to enable the multimedia data C&P device to insert the preset information into multimedia data captured by it;
  in step S420, determining whether a third party agrees to buy the multimedia data C&P device embedded with the preset information at a first price, or to buy a multimedia data C&P device not embedded with the preset information at a second price, the first price being higher than the second price, and;
  in step S430, if it is determined whether the third party agrees to buy the multimedia data C&P device embedded with the preset information, providing the multimedia data C&P device embedded with the preset information to the third party at the first price, to enable the third party to produce a user terminal including the multimedia data C&P device embedded with the preset information.

In a second aspect, according to the first aspect, before step S410, the computer based method further includes: receiving from the first party an agreement indicating that the first party agrees to pay a first fee for embedding the preset information into the multimedia data C&P device.

In a third aspect, according to the second aspect, step S410 includes: in response to receiving the agreement from the first party, embedding the preset information into the multimedia data C&P device.

In a fourth aspect, according to the second aspect, step S410 includes: in response to receiving the first fee from the first party, embedding the preset information into the multimedia data C&P device.

In a fifth aspect, according to the fist aspect, the preset information is advertisement provided by the first party.

In a sixth aspect, according to the first aspect, the step of embedding the preset information into the multimedia data C&P device in step S410 includes: storing the preset information into a memory equipped in the multimedia data C&P device.

In a seventh aspect, according to the first aspect, the step of embedding the preset information into the multimedia data C&P device in step S410 includes: storing the preset information into a first server accessible by the multimedia data C&P device; and storing an address for accessing the preset information stored in the first server into a memory equipped in the multimedia data C&P device.

In an eighth aspect, according to the first aspect, the computer based method further includes: in step S440, if it is determined whether the third party agrees to buy the multimedia data C&P device not embedded with the preset information, providing the multimedia data C&P device not embedded with the preset information to the third party at the second price, to enable the third party to produce a user terminal including the multimedia data C&P device not embedded with the preset information.

In a ninth aspect, according to the second aspect, step S410 includes: embedding an unlock code into the multimedia data C&P device along with the preset information, the unlock code being used to enable the multimedia data C&P device to stop inserting the preset information into multimedia data captured by it.

In a tenth aspect, according to the ninth aspect, the computer based method further includes: storing the unlock key in a second server for providing the unlock code to a fourth party who is a user of the user terminal produced by the third party.

In an eleventh aspect, according to the tenth aspect, the computer based method further includes: in response to the unlock code being provided to the fourth party, refunding a second fee to the first party, the second fee being less than the first fee.

In a twelfth aspect, according to the second aspect, the computer based method further includes: receiving the multimedia data uploaded by a fourth party who is a user of the user terminal produced by the third party; and removing the preset information from the uploaded multimedia data.

In a thirteenth aspect, according to the twelfth aspect, the computer based method further includes: in response to the preset information being removing from the multimedia data, refunding a third fee to the first party, the third fee being less than the first fee.

In a fourteenth aspect, according to the first aspect, the first party is an advertiser, the second party is a manufacture of the multimedia data C&P device, and the third party is the producer of the user terminal.

Hereinafter, a computing apparatus according to an embodiment of the present application will be described with reference to FIG. 13.

Figure 13:
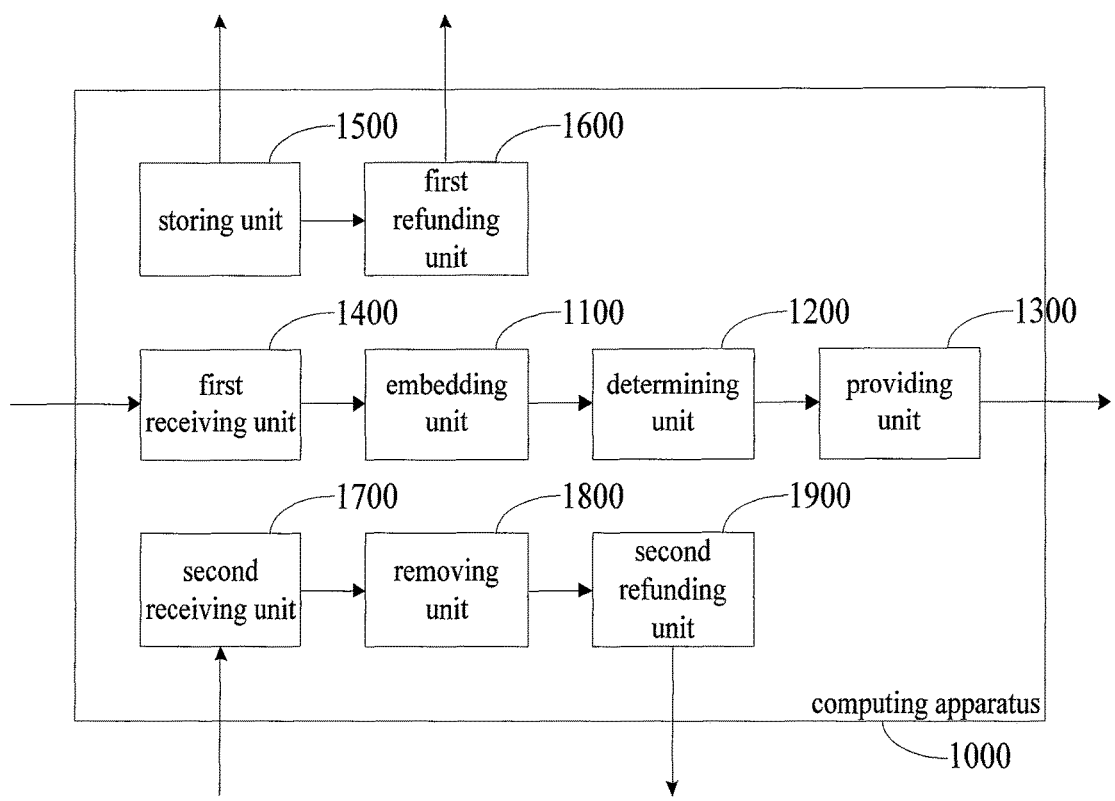
FIG. 13 is a block diagram depicting a computing apparatus according to an embodiment of the present application.

FIG. 13 is a block diagram depicting a computing apparatus according to an embodiment of the present application.

As shown in FIG. 13, the computing apparatus 1000 includes:
  an embedding unit 1100 configured for embedding a preset information received from a first party into a multimedia data C&P device manufactured by a second party, to enable the multimedia data C&P device to insert the preset information into multimedia data captured by it;
  a determining unit 1200 configured for determining whether a third party agrees to buy the multimedia data C&P device embedded with the preset information at a first price, or to buy a multimedia data C&P device not embedded with the preset information at a second price, the first price being higher than the second price, and;
  a providing unit 1300 configured for, if it is determined whether the third party agrees to buy the multimedia data C&P device embedded with the preset information, providing the multimedia data C&P device embedded with the preset information to the third party at the first price, to enable the third party to produce a user terminal including the multimedia data C&P device embedded with the preset information.

In one embodiment, the computing apparatus 1000 further includes a first receiving unit 1400 configured for receiving from the first party an agreement indicating that the first party agrees to pay a first fee for embedding the preset information into the multimedia data C&P device.

In one embodiment, the embedding unit 1100 embeds the preset information into the multimedia data C&P device in response to receiving the agreement from the first party.

In one embodiment, the embedding unit 1100 embeds the preset information into the multimedia data C&P device in response to receiving the first fee from the first party.

In one embodiment, the preset information is advertisement provided by the first party.

In one embodiment, the embedding unit 1100 stores the preset information into a memory equipped in the multimedia data C&P device.

In one embodiment, the embedding unit 1100 stores the preset information into a first server accessible by the multimedia data C&P device; and stores an address for accessing the preset information stored in the first server into a memory equipped in the multimedia data C&P device.

In one embodiment, the providing unit 1300 is further configured for, if it is determined whether the third party agrees to buy the multimedia data C&P device not embedded with the preset information, providing the multimedia data C&P device not embedded with the preset information to the third party at the second price, to enable the third party to produce a user terminal including the multimedia data C&P device not embedded with the preset information.

In one embodiment, the embedding unit 1100 embeds an unlock code into the multimedia data C&P device along with the preset information, the unlock code being used to enable the multimedia data C&P device to stop inserting the preset information into multimedia data captured by it.

In one embodiment, the computing apparatus 1000 further includes a storing unit 1500 configured for storing the unlock key in a second server for providing the unlock code to a fourth party who is a user of the user terminal produced by the third party.

In one embodiment, the computing apparatus 1000 further includes a first refunding unit 1600 configured for, in response to the unlock code being provided to the fourth party, refunding a second fee to the first party, the second fee being less than the first fee.

In one embodiment, the computing apparatus 1000 further includes a second receiving unit 1700 configured for receiving the multimedia data uploaded by a fourth party who is a user of the user terminal produced by the third party; and a removing unit 1800 configured for removing the preset information from the uploaded multimedia data.

In one embodiment, the computing apparatus 1000 further includes a second refunding unit 1900 configured for, in response to the preset information being removing from the multimedia data, refunding a third fee to the first party, the third fee being less than the first fee.

In one embodiment, the first party is an advertiser, the second party is a manufacture of the multimedia data C&P device, and the third party is the producer of the user terminal.

It can be seen that this proposal is a cross-discipline application, which may relate to multimedia sensors, image processing algorithms, internet, and the whole advertisement industry. In short summary, it is proposed in the present application an image sensor structure with integrated broadcasting capability and its related business model for increasing the added value of the obtained multimedia data, providing a wider range of user enjoyment, assuring a higher level of user convenience.

Through the above description of the embodiments, those skilled in the art can understand clearly that the present application may be implemented by means of software plus necessary hardware platforms, or of course, may also be implemented all by software or hardware. Based on such understanding, the entirety or a portion that the technical solutions of the present application contribute over the background art may be embodied in the form of a software product. The computer software product may be stored in storage medium, such as ROM/RAM, disk, optical disk, etc., and comprise several instructions for enabling one computer apparatus (which may be a personal computer, a server, or a network equipment, etc.) to execute the methods described in the respective embodiments or described in certain parts of the embodiments of the present application.

The flowchart and block diagrams in the Figures illustrate the architecture, functionality, and operation of possible implementations of systems, methods and computer program products according to various embodiments of the present application. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

Various embodiments of the present application are described above in detail. However, those skilled in the art should understand that various modifications, combinations or sub-combinations may be made to these embodiments without departing from the principles and spirits of the present application and such modifications should fall within the scope of the present application.

The invention claimed is:

1. A multimedia data capture and processing (C&P) device, comprising:
    a multimedia sensor configured to capture a first multimedia data, wherein the multimedia sensor comprises an image sensor integrated and embedded during manufacture of said image sensor with a plurality of preset information and a predetermined key for comparing to an unlock code input, wherein the plurality of preset information is for broadcasting to people and being viewed by people and the content of the plurality of preset information is selected from logo, image, company name, video clip, website name, manufacturer name, trademark, advertisement, audio clip, message, and advertising slogan;
    and a device processor configured to obtain one or more preset information from the plurality of preset information randomly, generate a second multimedia data according to the first multimedia data and the obtained one or more preset information, at least a part of the second multimedia data presenting the obtained one or more preset information and an original portion of the first multimedia data is hidden in a data file but in an encrypted way, and send the second multimedia data to an output device;
    wherein the device processor stops generating the second multimedia data and directly sends the first multimedia data to the output device, if the device processor receives the unlock code input and compares it to the predetermined key and the unlock code is consistent with the predetermined key.

2. The device of claim 1, wherein the device processor obtains the preset information having a multimedia format which is compatible with that of the first multimedia data from said plurality of preset information stored in the image sensor, and takes the obtained preset information as a third multimedia data.

3. The device of claim 2, wherein the device processor generates the second multimedia data by combining the first multimedia data and the third multimedia data.

4. The device of claim 2, wherein in the case that the first multimedia data and the third multimedia data are both images or videos, or in the case that the first multimedia data is a video and the third multimedia data is an image, the device processor inserts the third multimedia data at one corner of the first multimedia data to generate the second multimedia data.

5. The device of claim 2, wherein in the case that the first multimedia data and the third multimedia data are both audios, or in the case that the first multimedia data is a video and the third multimedia data is an audio, the device processor inserts the third multimedia into the first multimedia data at predetermined intervals to generate the second multimedia data.

6. The device of claim 2, further comprising a memory configured to store one or a plurality of data formats.

7. The device of claim 6, wherein the device processor obtains a data format from the plurality of data formats randomly or based on the content of the first multimedia data, generates a third multimedia data according to the preset information having a plain-text format and the obtained data format, and generates the second multimedia data by combining the first multimedia data and the third multimedia data.

8. The device of claim 1, wherein the preset information is an advertising information.

9. The device of claim 1, wherein the advertising information is an advertising information of a manufacturer of the image sensor.

10. A user terminal, comprising:
    a terminal processor configured to generate a multimedia data capturing instruction for capturing a first multimedia data;
    a multimedia data capture and processing (C&P) device comprising:
        a multimedia sensor configured to capture the first multimedia data, wherein the multimedia sensor comprises an image sensor integrated and embedded during manufacture of said image sensor with a plurality of preset information and a predetermined key for comparing to an unlock code input, wherein the plurality of preset information is for broadcasting to people and being viewed by people and the content of the plurality of preset information is selected from logo, image, company name, video clip, website name, manufacturer name, trademark, advertisement, audio clip, message, and advertising slogan; and
        a device processor configured to obtain one or more preset information from the plurality of preset information randomly, and generate a second multimedia data according to the first multimedia data and the obtained one or more preset information, at least a part of the second multimedia data presenting the obtained one or more preset information and an original portion of the first multimedia data is hidden in a data file but in an encrypted way; and
    an output device configured to receive the second multimedia and output it to a user;
    wherein the device processor stops generating the second multimedia data and directly sends the first multimedia data to the output device, if the device processor receives the unlock code input and compares it to the predetermined key and the unlock code is consistent with the predetermined key.

11. The terminal of claim 10, further comprising an input device configured to receive the unlock code for disabling the generation of the second multimedia data.

12. The terminal of claim 10, further comprising a communication device in communication with a multimedia data processing server and configured to send the second multimedia data to the multimedia data processing server for an inverse multimedia data processing, and to receive the first multimedia data from the multimedia data processing server.

13. The terminal of claim 12, wherein the communication device is also in communication with an information server and further configured to receiving the preset information from the information server.

14. The terminal of claim 13, wherein the preset information is an advertising information.

15. A multimedia data processing server implemented with computer processor and memory, comprising:
  (i) a communication device in communication with a user terminal, wherein the user terminal comprises:
    a terminal processor configured to generate a multimedia data capturing instruction for capturing a first multimedia data;
    a multimedia data capture and processing (C&P) device comprising:
      a multimedia sensor configured to capture the first multimedia data, wherein the multimedia sensor comprises an image sensor integrated and embedded during manufacture of said image sensor with a plurality of preset information and a predetermined key for comparing to an unlock code input, wherein the plurality of preset information is for broadcasting to people and being viewed by people and the content of the plurality of preset information is selected from logo, image, company name, video clip, website name, manufacturer name, trademark, advertisement, audio clip, message, and advertising slogan; and
      a device processor configured to obtain one or more preset information from the plurality of preset information randomly, and generate a second multimedia data according to the first multimedia data and the obtained one or more preset information, at least a part of the second multimedia data presenting the obtained one or more preset information and an original portion of the first multimedia data is hidden in a data file but in an encrypted way; and
    an output device configured to receive the second multimedia and output it to a user;
    wherein the device processor stops generating the second multimedia data and directly sends the first multimedia data to the output device, if the device processor receives the unlock code input and compares it to the predetermined key and the unlock code is consistent with the predetermined key; and
    wherein the communication device is configured to receive the second multimedia data from the user terminal, at least a part of the second multimedia data presenting one or more preset information; and
  (ii) a server processor configured to remove the one or more preset information from the second multimedia data to generate a first multimedia data, the communication device being further configured to send the first multimedia data to the user terminal.

16. The server of claim 15, further comprising:
a verifying device configured to verify whether a payment has been received from the user terminal, and instruct the server processor to remove the preset information from the second multimedia data when it is verified that the payment has been received.

* * * * *